US010731722B2

(12) United States Patent
Szekely et al.

(10) Patent No.: US 10,731,722 B2
(45) Date of Patent: Aug. 4, 2020

(54) JOUNCE BUMPER (71) Applicant: DUPONT POLYMERS, INC., Wilmington, DE (US)

(72) Inventors: Peter Laszlo Szekely, Pringy (FR); Bryan Morris, Coppet (CH); Sebastien Thomasson, Saint-Julien Engenvois (CH)

(73) Assignee: E. I. DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 15/551,978

(22) PCT Filed: Feb. 11, 2016

(86) PCT No.: PCT/US2016/017530
§ 371 (c)(1),
(2) Date: Aug. 18, 2017

(87) PCT Pub. No.: WO2016/133780
PCT Pub. Date: Aug. 25, 2016

(65) Prior Publication Data
US 2018/0031068 A1 Feb. 1, 2018

Related U.S. Application Data (60) Provisional application No. 62/117,563, filed on Feb. 18, 2015.

(51) Int. Cl.
*B60G 11/22* (2006.01)
*F16F 1/371* (2006.01)
(Continued)

(52) U.S. Cl.
CPC ............ *F16F 1/3713* (2013.01); *B60G 11/22* (2013.01); *F16F 1/376* (2013.01); *F16F 1/3732* (2013.01);
(Continued)

(58) Field of Classification Search
CPC . B60G 11/22; F16F 1/373; F16F 1/376; F16F 1/3732; F16F 1/387
See application file for complete search history.

(56) References Cited

U.S. PATENT DOCUMENTS 4,235,427 A 11/1980 Bialobrzeski
4,681,304 A 7/1987 Hassan
(Continued)

FOREIGN PATENT DOCUMENTS

CN 101585308 A 11/2009
CN 101675265 A 3/2010
(Continued)

OTHER PUBLICATIONS

PCT International Search Report and Written Opinion for International Application No. PCT/US2016/017530 dated May 25, 2016.
(Continued)

*Primary Examiner* — Nicholas J Lane (57) ABSTRACT

Provided herein is a jounce bumper (18) for mounting in a vehicle suspension system (2) comprising a shock absorber (6), the jounce bumper (18) having a central bore (20) extending in an axial direction (A). The jounce bumper (18) comprises an elastically compressible bumper portion (24) comprising a plurality of convolutes stacked in an axial direction (A) of the jounce bumper (18), each convolute comprising a crest (26) and a root (28). A cross-section of the compressible portion (24) perpendicular to the axial direction (A) is non-circular, the non-circular shape being configured to provide a variable compression resistance in relation to an axial compression displacement (Cd) of the jounce bumper (18).

17 Claims, 4 Drawing Sheets (51) Int. Cl.
 *F16F 9/58* (2006.01)
 *F16F 1/373* (2006.01)
 *F16F 1/376* (2006.01)
 *B60G 15/06* (2006.01)

(52) U.S. Cl.
 CPC .............. *F16F 9/58* (2013.01); *B60G 15/065* (2013.01); *B60G 2202/143* (2013.01); *B60G 2800/162* (2013.01); *F16F 2228/066* (2013.01); *F16F 2236/04* (2013.01)

(56) References Cited

U.S. PATENT DOCUMENTS

| | | | |
|---|---|---|---|
| 5,192,057 A | 3/1993 | Wydra et al. | |
| 5,280,889 A | 1/1994 | Amil et al. | |
| 5,580,033 A | 12/1996 | Burkley et al. | |
| 2006/0290039 A1* | 12/2006 | Cao | A47C 27/065 267/153 |
| 2008/0272529 A1 | 11/2008 | Chervin et al. | |
| 2009/0288923 A1* | 11/2009 | Hwang | B60G 11/54 188/268 |
| 2010/0025903 A1* | 2/2010 | Thye-Moormann | F16F 1/3732 267/153 |
| 2011/0133380 A1* | 6/2011 | Harden | B60G 11/52 267/292 |
| 2011/0156327 A1 | 6/2011 | Nobusue et al. | |
| 2012/0104672 A1 | 5/2012 | Chervin et al. | |
| 2012/0193850 A1* | 8/2012 | Szekely | F16F 1/3732 267/292 |
| 2014/0183804 A1 | 7/2014 | Szekely et al. | |

FOREIGN PATENT DOCUMENTS

| | | |
|---|---|---|
| CN | 101802438 A | 8/2010 |
| CN | 103080594 A | 5/2013 |
| EP | 2603714 A1 | 6/2013 |
| JP | 58-128062 A | 7/1983 |
| JP | 59-166736 A | 9/1984 |
| JP | 60-035938 A | 2/1985 |
| JP | 02-005136 A | 1/1990 |
| JP | 2006-515635 A | 6/2006 |
| JP | 2010-526261 A | 7/2010 |
| JP | 6272959 B2 | 1/2018 |
| WO | 93/04302 A1 | 3/1993 |
| WO | 2003/042299 A1 | 5/2003 |
| WO | 2004/029155 A2 | 4/2004 |
| WO | 2008/137029 A2 | 11/2008 |
| WO | 2009/157567 A1 | 12/2009 |
| WO | 2009/157657 A2 | 12/2009 |
| WO | 2012/021612 A1 | 2/2012 |

OTHER PUBLICATIONS

Dupont Hytrel (R) HTR4275 BK316 Product Information Sheet, Dupont, 2008.

International Preliminary Report on Patentability, PCT/US16/17530, Agnes Wittmann Regis, Authorized Officer, IB, dated Aug. 31, 2017.

International Search Report and Written Opinion issued in International Application PCT/US2011/047242, dated Nov. 10, 2011.

\* cited by examiner

JOUNCE BUMPER

CROSS-REFERENCES TO RELATED APPLICATIONS

This application claims priority under 35 U.S.C. § 371 to International Application No. PCT/US2016/017530, filed on Feb. 11, 2016, which in turn claims priority to U.S. Provisional Appln. No. 62/117,563, filed on Feb. 18, 2015, each of which is incorporated herein by reference in its entirety.

FIELD OF THE INVENTION

This invention relates to a jounce bumper for a vehicle suspension system.

BACKGROUND OF THE INVENTION

Several patents and publications are cited in this description in order to more fully describe the state of the art to which this invention pertains. The entire disclosure of each of these patents and publications is incorporated by reference herein.

Jounce bumpers are found in vehicle suspension systems and typically comprise an elastic body mounted around a shock absorber rod and fixed to a structural element of the vehicle. The jounce bumper provides an elastic cushion for the end of travel of the shock absorber and coil spring under compression. The effect of the jounce bumper is to absorb impact, and it dampens noise, vibration and harshness (NVH) by preventing the articulated suspension components from fully compacting during shock impacts caused by heavy loads, potholes, curbs or objects in the road. In general, it is desired to maximize the absorption of energy in a jounce bumper in order to provide a progressive compression resistance and achieve a smoother ride over a wide range of driving and load conditions.

The energy absorption behavior of a jounce bumper can be measured by a compression test, where a plotted result of applied force and compression displacement (i.e. deformation) illustrates the elastic behavior of the jounce bumper. Usually deformation is plotted on the x-axis (in mm), and applied load (force) is plotted on the y-axis. Specifically, the area under the plotted curve represents the energy absorbed by the jounce bumper.

If the thickness profile of the wall of a jounce bumper is increased, the level of force required to compress the jounce bumper is also increased. However, this results in a stiffer jounce bumper but with reduced compression displacement, whereby less energy is absorbed in the jounce bumper.

An example of a jounce bumper with a non-uniform wall thickness is disclosed in US2014183804. Specifically, the wall thickness of the jounce bumper is non-uniform, such that the wall thickness in a root and a crest are different. The effect of the non-uniform wall thickness is a superior absorption of energy in relation to the applied force and axial deformation of the jounce bumper.

SUMMARY OF THE INVENTION

It is an object of the present invention to provide a jounce bumper with high energy storage and a large compression displacement at high forces.

It would be advantageous to provide a jounce bumper that is compact.

It would be advantageous to provide a jounce bumper that is economical to manufacture.

It would be advantageous to provide a jounce bumper that is easy to assemble in a suspension system and this assembly is strong and durable.

It would be advantageous to provide a jounce bumper that is robust and reliable.

Objects of this invention have been achieved by providing the jounce bumper according to claim 1.

Disclosed herein is a jounce bumper for mounting in a vehicle suspension system, the jounce bumper comprising a central bore extending along a compression axis, said jounce bumper comprising an elastically compressible bumper portion having a wall comprising a plurality of convolutes stacked in a direction of said compression axis. The jounce bumper has an elastically compressible bumper portion comprising a plurality of convolutes stacked in the compression axis direction of the jounce bumper, each convolute comprising a crest and a root. A cross-section of the compressible portion taken perpendicular to the compression axis direction is non-circular, the non-circular shape being configured to provide a variable compression resistance in relation to an axial compression displacement of the jounce bumper.

In an embodiment, the jounce bumper comprises stiffening elements arranged in the root of said convolutes, the stiffening elements being configured to provide a variable compression resistance in relation to a compression displacement of the jounce bumper.

The stiffening elements may advantageously be arranged at a regular distance from each other around the outer circumference of the jounce bumper.

There may advantageously be provided at least four stiffening elements arranged around a peripheral circumference of the convolute.

In an embodiment, the stiffening elements extend axially in the form of discrete ribs.

In an embodiment, the stiffening elements are formed as an integral portion of the jounce bumper wall, such that the stiffening elements are seamlessly integrated into the wall of the jounce bumper.

The relationship $L_{e0}/D_c$ between effective length of the jounce bumper ($L_{e0}$) and the crest outer diameter ($D_c$) may advantageously be smaller than 3.

In an embodiment, the pitch (P) between a crest to nearest adjacent crest is constant along the elastically compressible bumper portion.

In an embodiment, the pitch (P) between a crest to adjacent crest is variable along the elastically compressible bumper portion.

In an embodiment, the root is formed as an inward convolute and the crest is formed as an outward convolute in relation to the center longitudinal axis (A) of the jounce bumper, the root radius (Rr) being larger than the crest radius (Rc).

In an embodiment, the stiffening elements are provided with a maximum radial thickness in the center of the root and a decreasing radial thickness towards the crests.

In an embodiment, the stiffening element comprises a radial outer wall having a constant or variable width in the direction of the peripheral circumference of the jounce bumper, according to the variant, and sidewalls extending from the root to the radial outer wall.

In an embodiment, the stiffening elements may have a maximum width in the center of the root, the width decreasing in an axial direction towards ends of the stiffening element.

In an embodiment, the radial outer wall of the stiffening element has a radius of curvature that is larger than the radius of curvature of the root (Rs>Rr).

In an embodiment, a ratio (W) of the circumferential width of the ribs to the root circumference, defined by: the number of ribs, multiplied by the width of a rib at root (Ws), multiplied by 100, divided by the root diameter (Dr) multiplied by the constant Pi (approx. 3.14), is preferably in a range of 25<W<50 with W=(number of ribs*Ws*100)/(Pi*Dr).

In an embodiment, the stiffening element built has a height above 0.5 mm and preferably in a range of 2 to 6 mm.

In an embodiment, the sidewalls of the stiffening elements are angled at a non-zero draft angle in relation to a radial line extending through the centre of the stiffening element.

The draft angle ($\alpha d$) may advantageously be in the range of 2° to 15°.

The invention is also directed to an automotive vehicle suspension system, comprising a jounce bumper according to embodiments of the invention installed in a suspension of a vehicle so as to absorb the energy of extreme displacements of the suspension system. In particular, the jounce bumper may be installed on a suspension rod of a vehicle between a vehicle chassis and a shock absorber.

Further objects and advantageous aspects of the invention will be apparent from the claims, and from the following detailed description and accompanying figures.

BRIEF DESCRIPTION OF THE DRAWINGS

The invention will now be described with reference to the accompanying drawings, which by way of example illustrate the present invention and in which:

FIG. 1b is a bottom view of the jounce bumper of FIG. 1a;

FIG. 1c is a cross-sectional view of the jounce bumper through line A of FIG. 1a;

FIG. 1d is a cross-sectional view through line B of the jounce bumper in FIG. 1a;

FIG. 5b is a cross-sectional view of a portion of the suspension system illustrated in FIG. 5a.

DETAILED DESCRIPTION OF EMBODIMENTS OF THE INVENTION

Figure 5A:
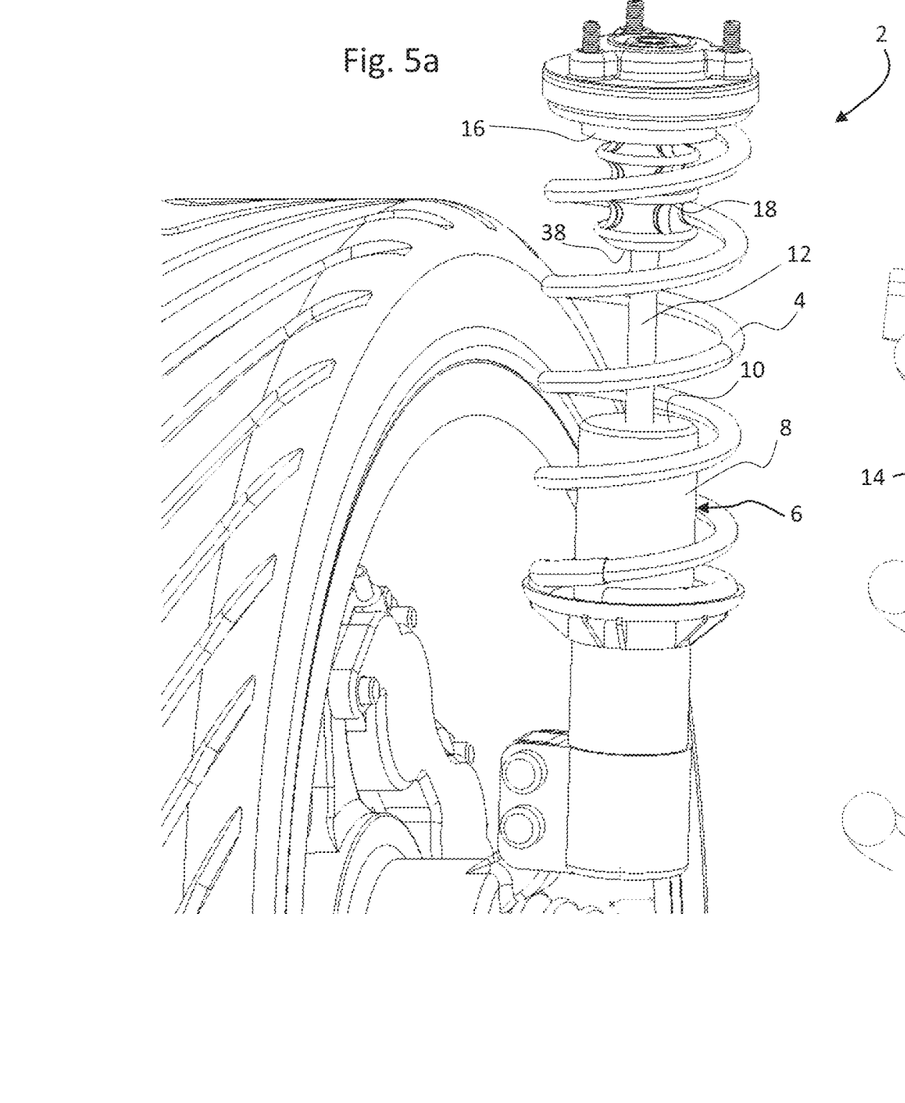
FIG. 5a is a schematic perspective view of a jounce bumper according to an embodiment of the present invention when mounted on a suspension strut of a vehicle.
Figure 5B:
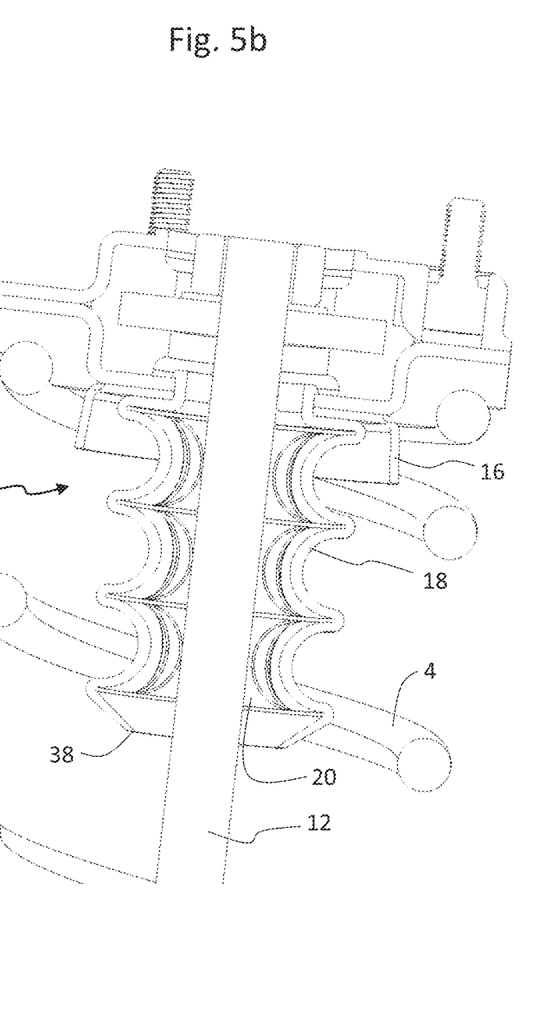

Referring to the figures, starting with FIGS. 5a, 5b, a vehicle suspension system 2 comprises a coil spring 4, a shock absorber 6, and a jounce bumper assembly 14. The suspension system 2 is typically mounted between an upper frame structure and a lower frame structure in a vehicle and arranged to reduce impact transfer therebetween.

Figure 1A:
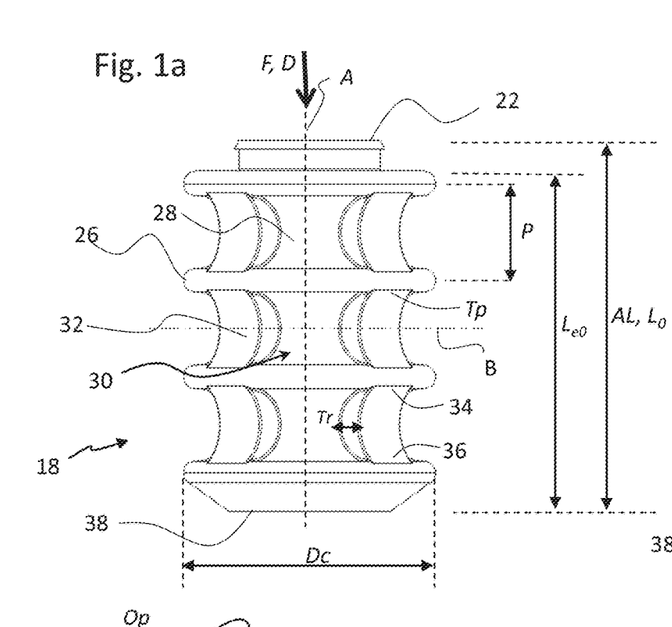
FIG. 1a is a side view of a jounce bumper according to an embodiment of the invention.
Figure 1B:
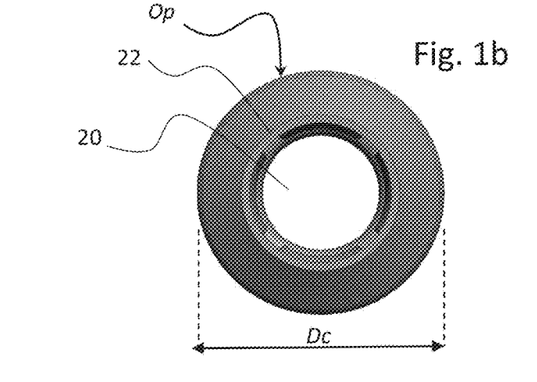
Figure 1C:
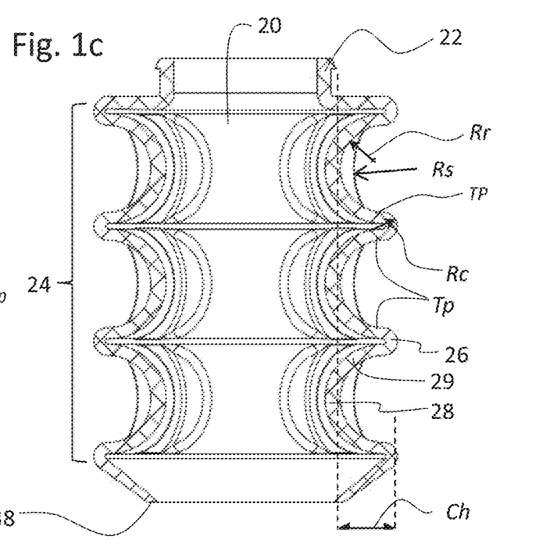

Referring now to FIG. 1c, the jounce bumper assembly comprises a jounce bumper 18 having an elastically compressible bumper portion 24, a mounting portion 22 for fixing the jounce bumper to a structural element and a central bore 20 extending through the elastically compressible portion 24. On the elastically compressible bumper portion 24, opposite to the mounting portion 22 a contact edge 38 is arranged as a free end which in use is configured to contact (see FIG. 5a) an end wall 10 of a cylinder 8 of the shock absorber 6 at a certain distance of travel of the shock absorber 6.

Referring to FIG. 5b, the jounce bumper assembly 14 may also comprise a structural element 16 such as a cushion or saturation cup. The structural element is part of, or fixed to, the vehicle structural element or elements to which the end of the shock absorber piston rod 12 is fixed. The structural element 16 serves to receive the jounce bumper 18 therein, as it is being compressed, and to limit the radial expansion of the jounce bumper 18 during compression thereof. Although the cushion cup 16 is advantageous in many configurations, certain jounce bumpers may function without the cushion cup and may thus be fixed on a structural element that is not in the form of a cushion cup. For instance, for thermoplastic elastomer jounce bumpers it is advantageous for there to be no contact between the outer diameter of the jounce bumper and the inner diameter of the saturation cup. Contrarily to polyurethane foam jounce bumpers, thermoplastic elastomer jounce bumpers typically do not need to limit their radial expansion.

Referring now to FIGS. 1a to 1d, the elastically compressible bumper portion 24 of the present invention has a bellow-shaped wall 30 comprising a plurality of convolutions in the shape of crests 26 and roots 28, with flank portions 29 extending between the crests 26 and the roots 28. The convolutions form bellows where each bellow is defined as a crest 26 and a root 28. As illustrated in the figures, the crest 26 can be seen as an outward convolute and the root 28 can be seen as an inward convolute in relation to a center longitudinal axis A of the jounce bumper 18. As seen in FIG. 1b, each crest 26 forms a closed shape defining a peripheral circumference Op of the jounce bumper 18 when viewed in the direction of the compression axis A.

The size of the inward and the outward convolutes of the crests 26 and the roots 28 can be defined by their curve radius. As best seen in FIG. 1c, the inward convolutes formed by the roots 28 can be defined as a segment of a circle with a root radius Rr. In a similar way, the outward convolutes formed by the crests 26 can be defined as a segment of a circle with a crest radius Rc. In the context of this invention, an "inward" jounce bumper is a jounce bumper wherein the root radius Rr is larger than the crest radius Rc. Conversely, an "outward" jounce bumper is a jounce bumper wherein the root radius Rr is smaller than the crest radius Rc. The root 28 has a diameter Dr and the crest 26 has a diameter Dc.

Still referring to FIGS. 1a to 1d, the distance in the axial compression direction A from crest 26 to nearest adjacent crest 26 is defined as the pitch P. In the illustrated example, the pitch P is constant, meaning that the distance from crest 26 to nearest adjacent crest 26 is always the same. However, within the scope of the present invention it is also possible to arrange the crests 26 with a variable pitch P along the axial length AL of the jounce bumper 18.

The rigidity of the jounce bumper 18 is also dependent on the wall thickness of the bellow-shaped wall 30. The thicker the bellow shaped wall 30 is, the higher the rigidity of the jounce bumper 18 is.

Figure 1D:
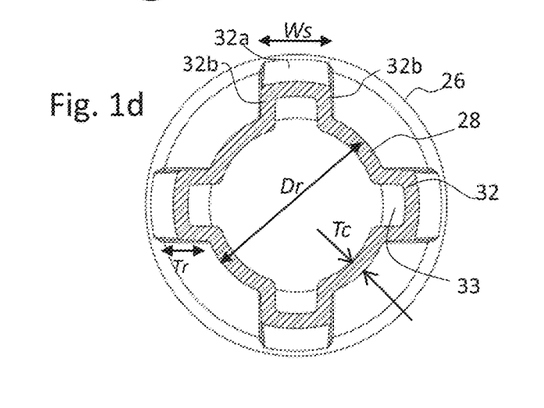
Figure 2:
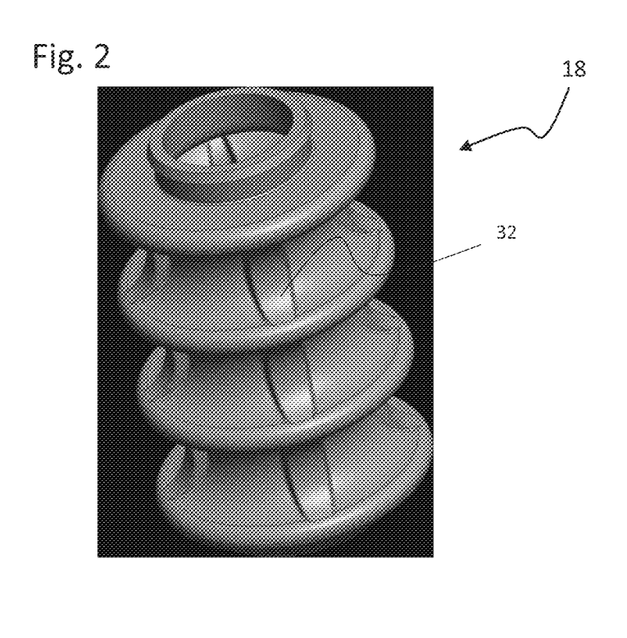
FIG. 2 is a view in perspective of a jounce bumper according to an embodiment of the invention.

As best seen in FIGS. 1a and 1b, the jounce bumper 18 according to an embodiment is configured as an inward jounce bumper provided with crests 26 and roots 28 and stiffening elements 32 arranged in the convolutions of the jounce bumper 18. In this embodiment, the crests 26 may have a circular profile in a cross-section orthogonal to the compression axis, as best seen in FIG. 1b or 1d. As best seen in FIG. 1d, a cross section of the jounce bumper taken perpendicularly to the compression axis, shows a non-circular shape of the root and flank portion of the convolute because of the presence of the stiffening elements 32 that are in the form of axially extending ribs that locally projects from the roots 28. Preferably there are at least 3 discrete stiffening elements 32 arranged spaced apart around the axis A, preferably spaced apart equidistantly. There may advantageously be four to eight stiffening ribs 32 arranged around each convolute. In some embodiments, jounce bumpers 18 comprise fewer than four or more than eight stiffening elements 32. The stiffening elements 32 are preferably formed as an integral portion of the bellow-shaped wall 30 and are preferably hollow 33. The jounce bumper 18 may advantageously be formed in a blow-molding process.

The stiffening elements 32 are preferably arranged as projections from the bellow-shaped wall 30, and are formed within the root 28 and flank 29. Advantageously, the stiffening elements 32 are arranged in the convolute 28 having the largest curve radius Rr. In a variant (not shown), the stiffening elements 32 may also be formed on a radially inner surface of the jounce bumper wall, for instance in a similar manner to the aforementioned stiffening elements 32, namely discrete axially extending ribs projecting radially inwardly.

Now referring to FIG. 1a, the stiffening elements 32 have a first end 34 and a second end 36. The first end 34 and the second end 36 may advantageously be positioned in a transition point $T_P$ between the root 28 and the crest 26. As best seen in FIGS. 1a and 1c, the transition point $T_P$ can be defined as a point on the bellow shaped wall 30 where the tangents of the crest 26 and the root 28 coincide. The stiffening elements 32 preferably have a maximum radial height Tr at the position of the axial center height of the root 28 and a decreasing height therefrom towards the crests.

Figure 4:
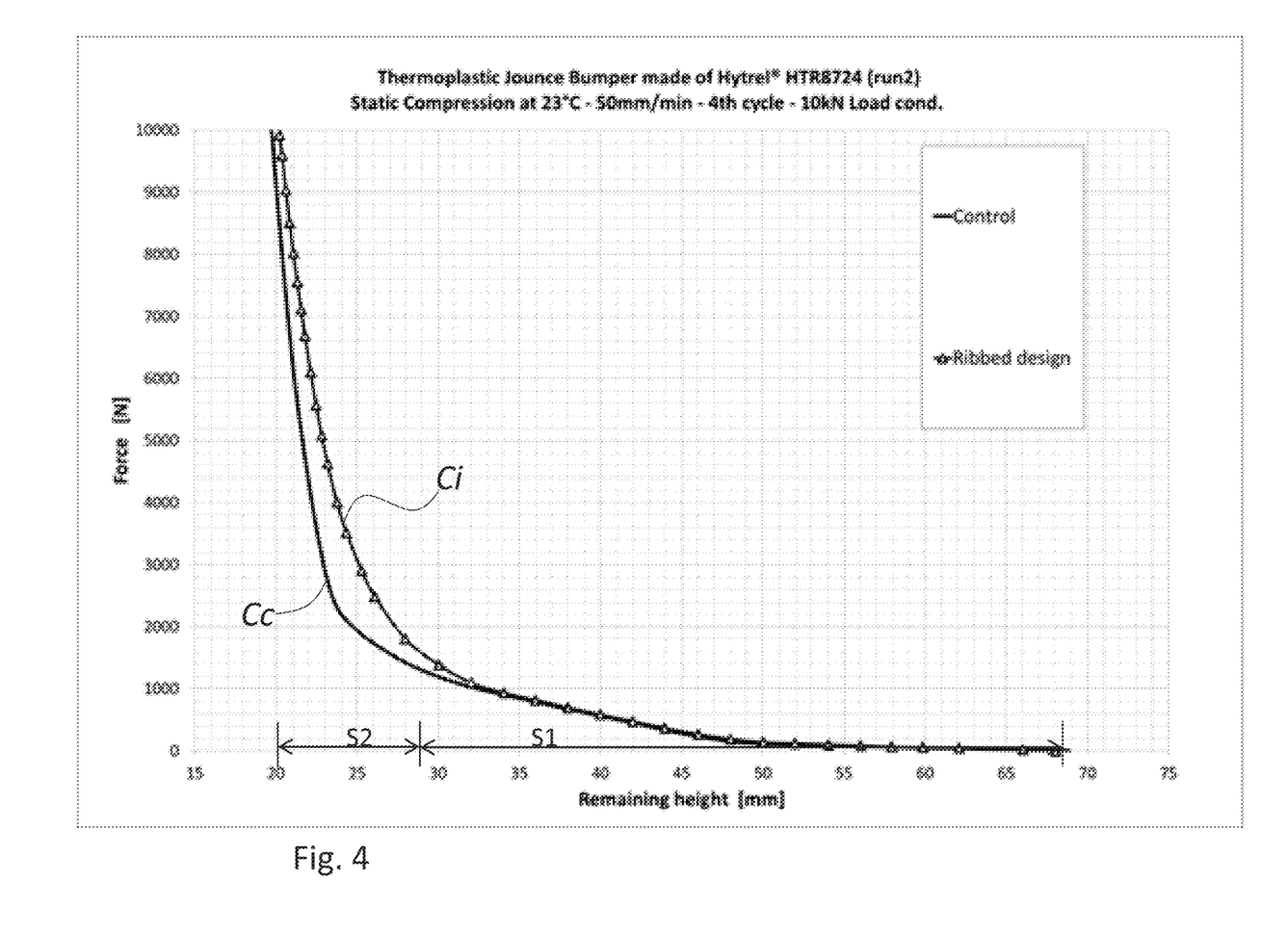
FIG. 4 is a graphical representation of the relationship between the compression displacement and the applied force of a prior art jounce bumper and a jounce bumper according to an embodiment of the invention.

Referring now to FIG. 4, the jounce bumper 18 provides essentially two stages of compression S1 and S2, whereby the rigidity under a first stage of compression is smaller than the rigidity of the jounce bumper 18 in a second stage of compression. The stiffening elements 32 are provided with a shape which enables a smoother transition of the value of the rigidity between the first and second stage of compression. This is illustrated in the graph of FIG. 4 comparing the Force/Displacement curve Ci of a ribbed design according to the invention and the Force/Displacement curve Cc of a conventional jounce bumper without ribs. The stiffening ribs of the inventive jounce bumper 18 advantageously results in a less abrupt and more progressive compression of the jounce bumper 18 as it transitions from the first stage S1 to the second stage S2 and approaches full compression.

Referring to the specific examples tested in FIG. 4, the two jounce bumpers with three convolutes have been produced with a constant thickness parison and the same settings of Ossberger machine (70% of die opening with straight profile). A constant thickness parison means no variation of thickness along its length before blowing. The measure dimensions of molded parts (as molded without any load conditioning) are presented in the table below.

|  | Control or reference jounce bumper without any rib | Invention jounce bumper 18 with Rib |
|---|---|---|
| Weight | 54.1 g | 53.8 g |
| Effective length (from upper shoulder to bending lip included) | 79.3 mm | 78.8 mm |
| Outer diameter at peak (Dc) | 59.1 mm | 58.9 mm |
| Inner diameter at trough (Dr) | 36.9 mm | 36.5 mm |
| Pitch (P) | 22.7 mm | 22.5 mm |
| Maximum wall thickness at root Tc | 3.9 mm | 4.1 mm |
| Thickness at intermediate location (Tm) | 1.5 mm | 1.5 mm |
| Number of ribs | 0 | 4 equally distributed |
| Width of the rib (Ws) | na | 8.2 mm |
| Rib draft angle (alpha d) | na | 10 deg |
| Height of rib at root (tr) | na | 3.0 mm |

Note:
Each rib can be defined by its width at trough, its depth at trough and a draft angle to connect it to the jounce bumper convolute. The dimensions above are average dimensions measured on molded parts. Shrinkage of the material and variation of molding from shot to shot may affect these dimensions slightly.

Another significant benefit of the invention is the increase of energy absorption when the jounce bumper 18 is fully compressed. In the above example, the energy absorbed when a force of 9900N is applied is respectively 43.7 Joules and 51.4 Joules for the control and the inventive jounce bumper 18 (+17.6% relative increase of energy absorption). The stiffening elements 32 according to embodiments of the invention increases the rigidity of the jounce bumper 18 without reducing its ability to be fully compressed and this explains the significant increase of energy absorption.

Referring now to FIG. 1d, the stiffening element 32 comprises a radial outer wall 32a having a width Ws in the direction of the peripheral circumference Op (FIG. 1b) of the jounce bumper 18, and sidewalls 32b extending from the root 28 to the radial outer wall 32a. For an inward jounce bumper embodiment as illustrated in FIG. 1c, the radial outer wall 32a of the stiffening elements 32 has a radius of curvature Rs that is larger than the radius of curvature Rr of the root 28.

By way of example, in certain embodiments the stiffening ribs of a jounce bumper according to an embodiment of the invention may be defined by the following dimensions:

Ws=width of the rib at root or maximum width of the rib. (An example may for instance have a value of Ws=8.2 mm).

W=number of ribs×Ws×100/(3.14×Dr). A preferred range is 25%<W<50%. (An example may for instance have a value W=(4×8.2×100)/(3.14×36.5)=28.6%).

Tr is radial height of the rib measured at root. Generally speaking, it is the maximum distance between the root and stiffening element radii in case of an inward curved jounce bumper. (An example may for instance have a value of Tr=3.0 mm).

αd is the draft angle on each side of the stiffening rib (An example may for instance have a value of αd=10°).

Figure 3:
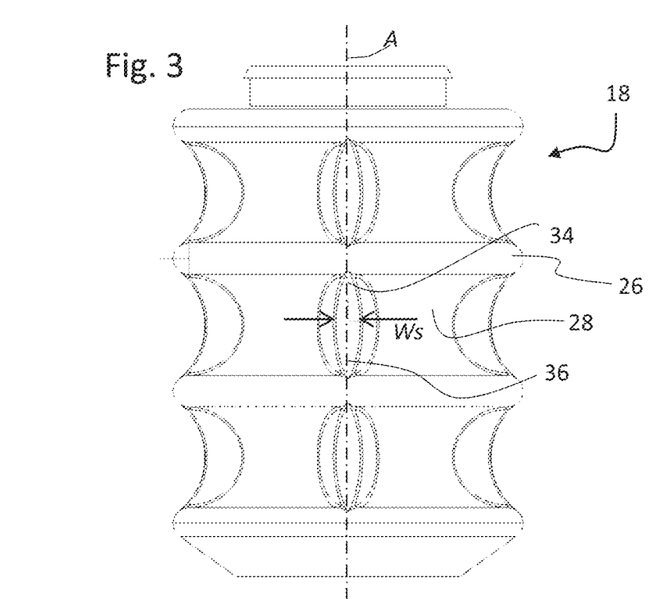
FIG. 3 is a side view of a jounce bumper according to an embodiment of the invention.
Figure 3A:
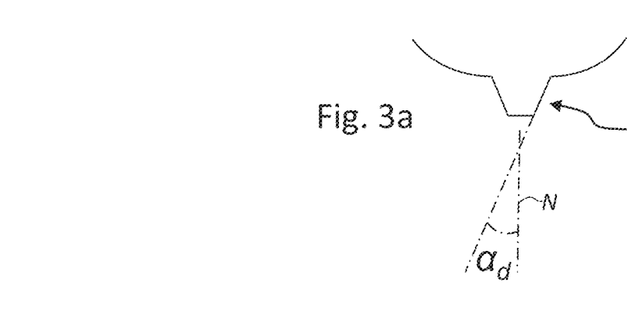
FIG. 3a is a schematic simplified view of a stiffening element to illustrate a draft angle.

Referring now to FIGS. 3 and 3a, in an embodiment, the axial ends 34, 36 of the stiffening element 32 may be essentially tangent to the jounce bumper convolutions proximate the crest 26. In variants, the stiffening elements 32 may however occupy only a portion of the root or terminate at a non-tangential angle with the adjacent root section.

As best seen in FIG. 3, in an embodiment the average width of the stiffening element 32 may vary along the axial direction A of the jounce bumper 18. Preferably, the stiffening elements 32 have a maximum width Ws in the center of the root, which may decrease in a direction towards the first end 34 and second end 36. The sidewalls may be angled at a non-zero draft angle $\alpha_d$ (see FIG. 3a) in relation to a normal N (radial line) extending through the centre of the stiffening element. The draft angle αd may advantageously be in the range of 3° to 30°.

As best seen in FIGS. 1c and 1d, the elastically compressible bumper portion 24 of the jounce bumper 18 has a non-circular shape in a cross-section orthogonal to the compression center axis A. Specifically, in the illustrated embodiment the stiffening elements 32 produce a non-circular cross-section of the root 28, whereas at the crest 26, the cross-section of the elastically compressible bumper portion 24 may be circular.

According to an exemplary (non-illustrated) embodiment of the present invention, it is also possible to configure the elastically compressible bumper portion as an "outward" jounce bumper, whereby the crest radius is larger than the root radius and the stiffening ribs are located in the crest inside the jounce bumper.

In a preferred embodiment, the jounce bumper 18 comprises a plurality of stacked crests 26 and roots 28 that are essentially identical and aligned in the axial direction A as shown in the illustrated embodiment of FIGS. 1a, 1b. However, in a variant (not illustrated), the stiffening elements 32 of one convolution may be angularly offset with the stiffening elements 32 of another convolution such that the stacked stiffening elements are not aligned in the compression direction A.

The jounce bumper 18 according to the present embodiment may advantageously be made from a single part by extrusion blow molding process, providing a robust and resistant jounce bumper with high performance compression characteristics that is nevertheless economical to produce and to assemble. However, it is also possible to manufacture the jounce bumper by other processes, such as injection blow molding, corrugated extrusion or rotomolding.

Materials for the jounce bumper 18 according to the present invention are preferably resilient and have an excellent flex life. Suitable materials include, without limitation, any thermoplastic elastomer. Preferably, a thermoplastic elastomer is used that has a relatively high melt viscosity (i.e. a melt flow rate between 0.5 and 8 g/10 min, more preferably between 1 and 8 g/10 min, more preferably between 2 and 6 g/10 min, more preferably between 3 and 5 g/10 min, particularly preferably 4 g/10 min at 230° C. under 5 kg load according to ISO1133). Preferably the elastomer has a hardness between at or about 45 and 60D, more preferably at or about 47 to 55D (at 1s according to ISO868). Examples of thermoplastic elastomers useful for the jounce bumper 18 of the present invention include those defined in ISO 18064:2003(E), such as thermoplastic polyolefinic elastomers (TPO), styrenic thermoplastic elastomers (TPS), thermoplastic polyether or polyester polyurethanes (TPU), thermoplastic vulcanizates (TPV), thermoplastic polyamide block copolymers (TPA), copolyester thermoplastic elastomers (TPC) such as copolyetheresters or copolyesteresters, and mixtures thereof; also suitable materials are thermoplastic polyesters and mixtures thereof.

LIST OF REFERENCES IN THE DRAWINGS

2 suspension system (automotive)
4 coil spring
6 shock absorber
8 cylinder (housing)
10 end wall
12 piston rod
14 jounce bumper assembly
16 structural element (cushion/saturation cup)
18 jounce bumper
20 central bore
22 mounting portion
24 elastically compressible bumper portion convolute
26 crest
28 root
29 flank
30 wall (bellow-shaped)
32 stiffening elements
34 first end
36 second end
32a radial outer wall
32b side walls
33 hollow
38 contact edge
A center longitudinal axis/compression axis/axial direction
AL axial length
P pitch
Rc crest radius
Rr Root radius
Rs stiffening element radius
$L_{e0}$ effective length of the jounce bumper
Ch crest height
Tc wall thickness
Tm wall thickness at intermediate location
Tr radial height of stiffening element
Tp transition point
Ws stiffening element width
$\alpha_d$ draft angle
N normal
Op peripheral circumference
F applied force
D direction of compression While certain of the preferred embodiments of the present invention have been described and specifically exemplified above, it is not intended that the invention be limited to such embodiments. Rather, it is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

The invention claimed is:

1. A jounce bumper made from a copolyester thermoplastic elastomer (18) for mounting in a vehicle suspension system comprising a shock absorber, the jounce bumper having a central bore (20) extending along a compression axis (A), said jounce bumper (18) comprising an elastically compressible bumper portion (24) having a wall (30) comprising a plurality of convolutes stacked in a direction of said compression axis (A), each convolute comprising a crest (26) and a root (28), characterized in that the convolutes comprise hollow stiffening elements (32), formed as an integral portion of the wall (30), and non-overlapping, and in that a cross-section of the jounce bumper perpendicular to the compression axis is non-circular, the non-circular shape resulting from the stiffening elements and configured to provide a variable compression resistance in relation to an axial compression displacement of the jounce bumper, wherein the root (28) is formed as an inward convolute and the crest (26) is formed as an outward convolute in relation to the center longitudinal axis (A) of the jounce bumper (18), a root radius of curvature (Rr) being larger than a crest radius of curvature (Rc).

2. The jounce bumper according to claim 1, wherein said plurality of stacked crests and roots are essentially identical and aligned in the axial direction.

3. The jounce bumper according to claim 1, wherein the stiffening elements (32) are arranged in the root of said convolutes.

4. The jounce bumper according to claim 1, wherein the stiffening elements are arranged at a regular distance from each other around the outer circumference of the jounce bumper.

5. The jounce bumper according to claim 1, wherein the stiffening elements are provided with a maximum radial height (Tr) in the center of the root and a decreasing radial thickness towards the crests.

6. The jounce bumper according to claim 1, wherein a ratio (Le0/Dc) of the jounce bumper effective length (Le0) over the crest outer diameter (Dc) is smaller than 3.

7. The jounce bumper according to claim 1, wherein the stiffening element comprises a radial outer wall (32a) having a width (Ws) in the direction of the peripheral circumference (Op) of the jounce bumper, and sidewalls (32b) extending from the root (28) to the radial outer wall (32a).

8. The jounce bumper according to claim 7, wherein a ratio of the circumferential width of the ribs to the root circumference, defined by:
the number of ribs multiplied by the width of a rib (Ws), divided by the root diameter (Dr) multiplied by Pi (approx. 3.14);
is in a range of 0.25 to 0.5.

9. The jounce bumper according to claim 7, wherein the radial outer wall of the stiffening element has a radius of curvature (Rs) that is larger than the radius of curvature (Rr) of the root.

10. The jounce bumper according to claim 1, wherein the stiffening elements have a maximum width (Ws) in the center of the root, which decreases in a direction towards a first end (34) and second end (36).

11. The jounce bumper according to claim 1, wherein sidewalls of the stiffening elements are angled at a non-zero draft angle ($\alpha d$) in relation to a radial line (N) extending through the center of the stiffening element.

12. The jounce bumper according to claim 11, wherein the draft angle ($\alpha d$) is in the range of 2° to 30°.

13. The jounce bumper according to claim 1, wherein the pitch (P) between a crest to the nearest adjacent crest is constant along the elastically compressible bumper portion (24).

14. The jounce bumper according to claim 1, wherein the pitch (P) between a crest to the adjacent crest is variable along the elastically compressible bumper portion (24).

15. An automotive suspension system (2), comprising the jounce bumper according to claim 1, wherein the jounce bumper is made of a thermoplastic elastomer.

16. The jounce bumper according to claim 8, wherein the radial outer wall of the stiffening element has a radius of curvature (Rs) that is larger than the radius of curvature (Rr) of the root.

17. The jounce bumper according to claim 1, which is made by a blow-molding process.

* * * * *